United States Patent
Yoo et al.

(10) Patent No.: US 11,166,036 B2
(45) Date of Patent: Nov. 2, 2021

(54) IMAGE PROCESSING METHOD AND APPARATUS THEREFOR

(71) Applicant: LG ELECTRONICS INC., Seoul (KR)

(72) Inventors: Sunmi Yoo, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/338,344

(22) PCT Filed: Sep. 28, 2017

(86) PCT No.: PCT/KR2017/010778
§ 371 (c)(1),
(2) Date: Mar. 29, 2019

(87) PCT Pub. No.: WO2018/062880
PCT Pub. Date: May 5, 2018

(65) Prior Publication Data
US 2020/0137404 A1   Apr. 30, 2020

Related U.S. Application Data

(60) Provisional application No. 62/401,898, filed on Sep. 30, 2016.

(51) Int. Cl.
*H04N 19/44* (2014.01)
*H04N 19/176* (2014.01)
*H04N 19/105* (2014.01)
*H04N 19/117* (2014.01)
*H04N 19/132* (2014.01)
*H04N 19/159* (2014.01)
*H04N 19/46* (2014.01)

(52) U.S. Cl.
CPC .......... *H04N 19/44* (2014.11); *H04N 19/105* (2014.11); *H04N 19/117* (2014.11);
(Continued)

(58) Field of Classification Search
CPC .... H04N 19/182; H04N 19/176; H04N 19/50; H04N 19/115; H04N 19/119; H04N 19/132; H04N 19/159
(Continued)

(56) References Cited

U.S. PATENT DOCUMENTS

2012/0082224 A1   4/2012   Van Der Auwera et al.
2012/0320974 A1   12/2012   Li et al.
(Continued)

FOREIGN PATENT DOCUMENTS

EP   2899982 A1   7/2015
JP   2013524681 A   6/2013
(Continued)

OTHER PUBLICATIONS

J. Lainema and W.J. Han, "Chapter 4 Intra-Picture Prediction in HEVC" In: "High Efficiency Video Coding (HEVC) Algorithms and Architectures", Aug. 23, 2014, Springer, XP055672865, pp. 91-112.
(Continued)

*Primary Examiner* — Tsion B Owens
(74) *Attorney, Agent, or Firm* — Dentons US LLP

(57) ABSTRACT

Disclosed are an image processing method and an apparatus therefor. Specifically, the image processing method comprises the steps of: obtaining an intra prediction mode; obtaining a reference sample using a neighboring sample of the current block; determining whether to perform filtering on the reference sample; filtering the reference sample if it is determined to perform the filtering; and generating a prediction block using the reference sample or the filtered reference sample on the basis of the prediction mode, wherein the current block is a non-square block, the reference sample comprises a left reference sample and a top reference sample, and whether to perform the filtering is
(Continued)

determined on the basis of at least one of a current block parameter or a surrounding block parameter.

9 Claims, 11 Drawing Sheets

(52) U.S. Cl.
CPC ......... *H04N 19/132* (2014.11); *H04N 19/159* (2014.11); *H04N 19/176* (2014.11); *H04N 19/46* (2014.11)

(58) Field of Classification Search
USPC .......................................... 375/240.1–240.29
See application file for complete search history.

(56) References Cited

U.S. PATENT DOCUMENTS

2016/0345007 A1* 11/2016 Jaeger .................. H04N 19/136
2019/0174128 A1* 6/2019 Jang ..................... H04N 19/119
2019/0182481 A1* 6/2019 Lee ........................ H04N 19/44

FOREIGN PATENT DOCUMENTS

| KR | 1020130063030 A | 6/2013 |
| KR | 10-2013-0126928 A | 11/2013 |
| KR | 10-2014-0057517 A | 5/2014 |
| KR | 10-2015-0024440 A | 3/2015 |
| KR | 10-2016-0082250 A | 7/2016 |
| KR | 10-2013-0110127 A | 10/2016 |

OTHER PUBLICATIONS

JCT-VC, "Test Model under Consideration", Joint Collaborative Team on Video Coding (JCT-VC) of ITU-T SG16 WP3 and ISO/IEC JTC1/SC291WG11, Jul. 21-28, 2010, JCTVC-B205, XP055674345.

B. Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Jan. 14-23, 2013, JCTVC-L1003_v34.

* cited by examiner

[Fig. 1]
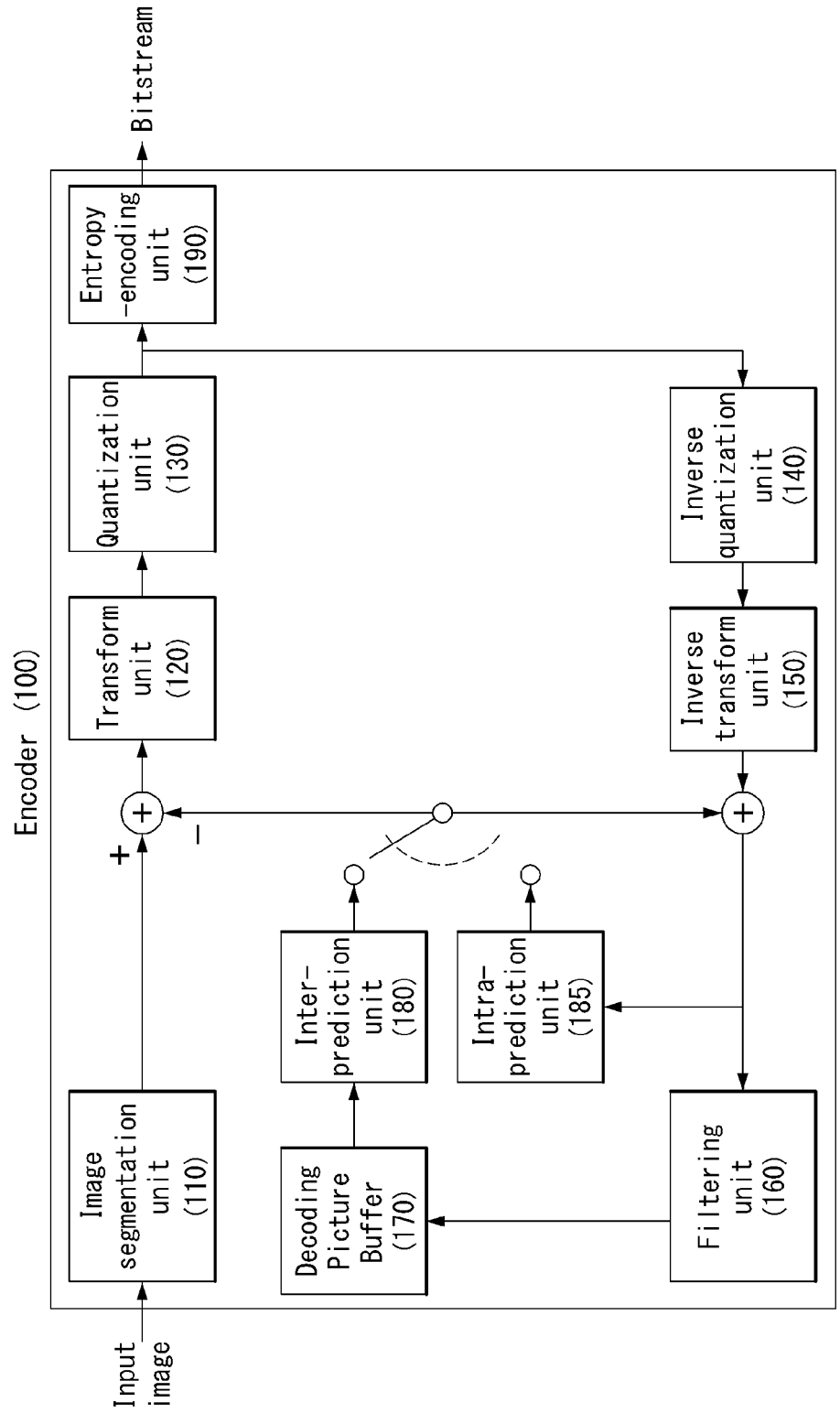

[Fig. 2]
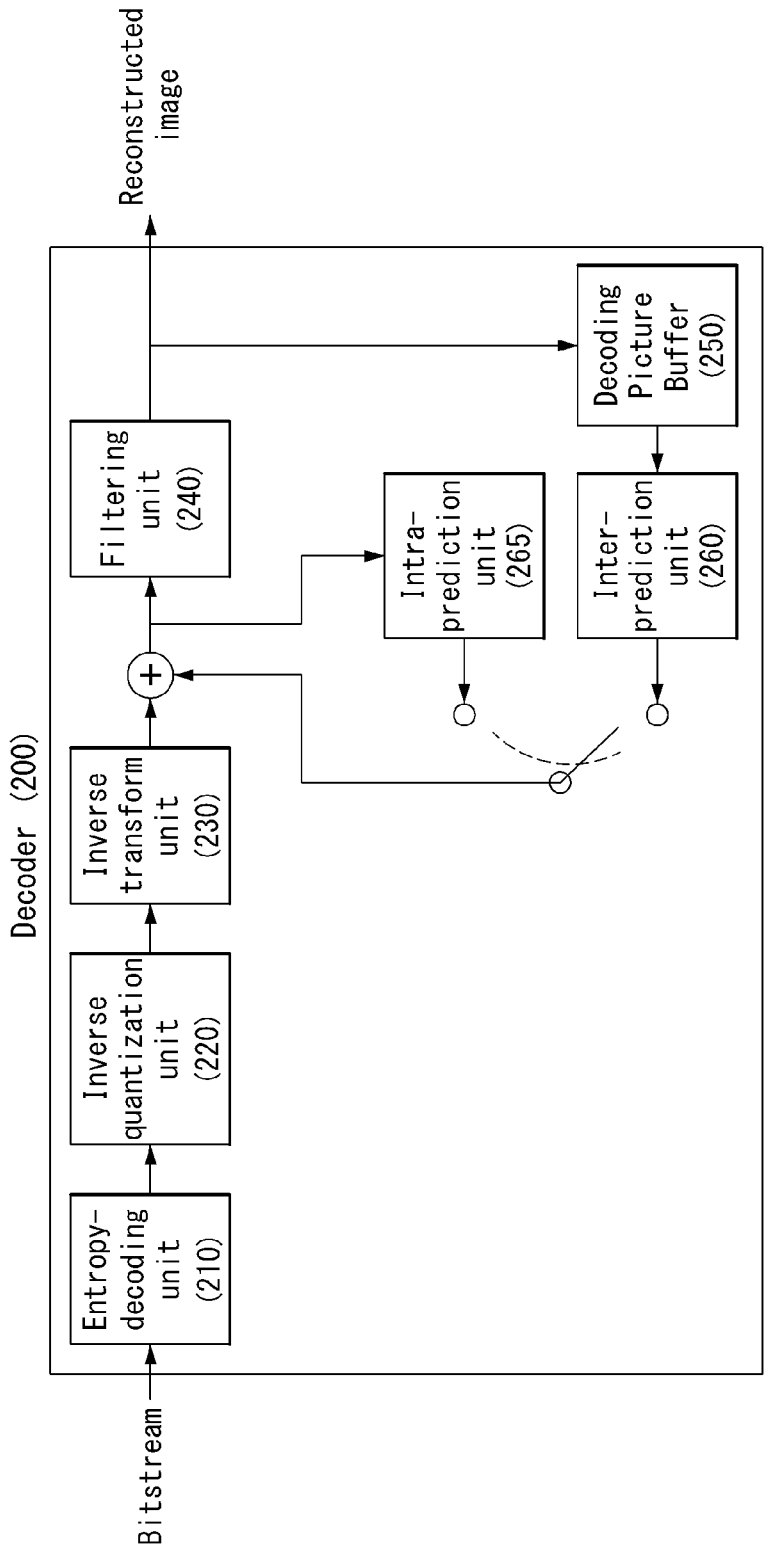

[Fig. 3]
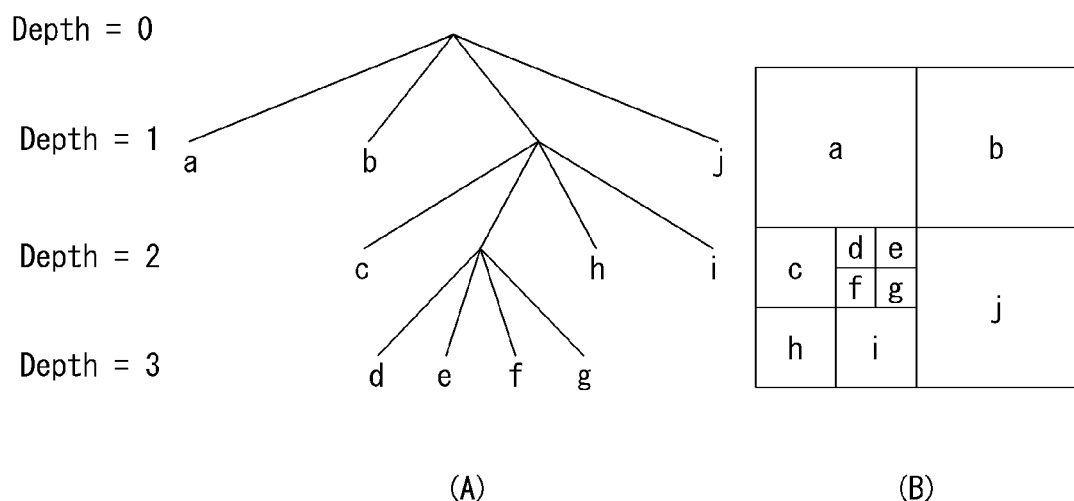

[Fig. 4]
Intra:
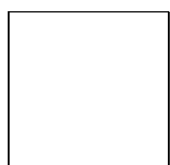
2Nx2N
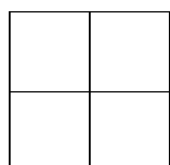
NxN
Inter:
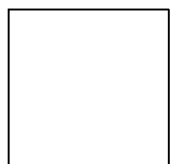
2Nx2N
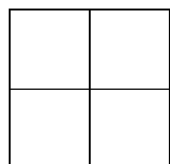
NxN
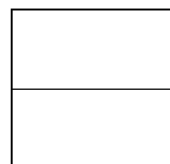
2NxN
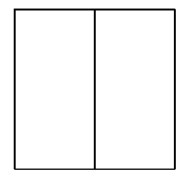
Nx2N
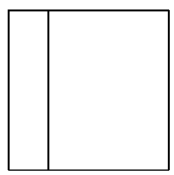
nLx2N
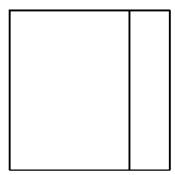
nRx2N
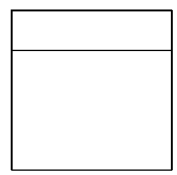
2NxnU
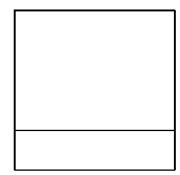
2NxnD

[Fig. 5]
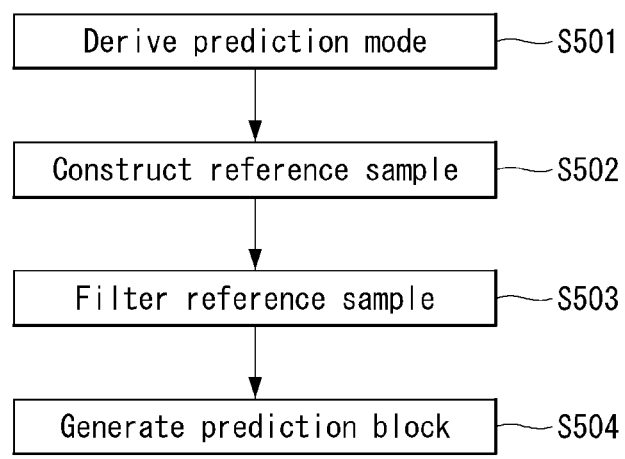

[Fig. 6]
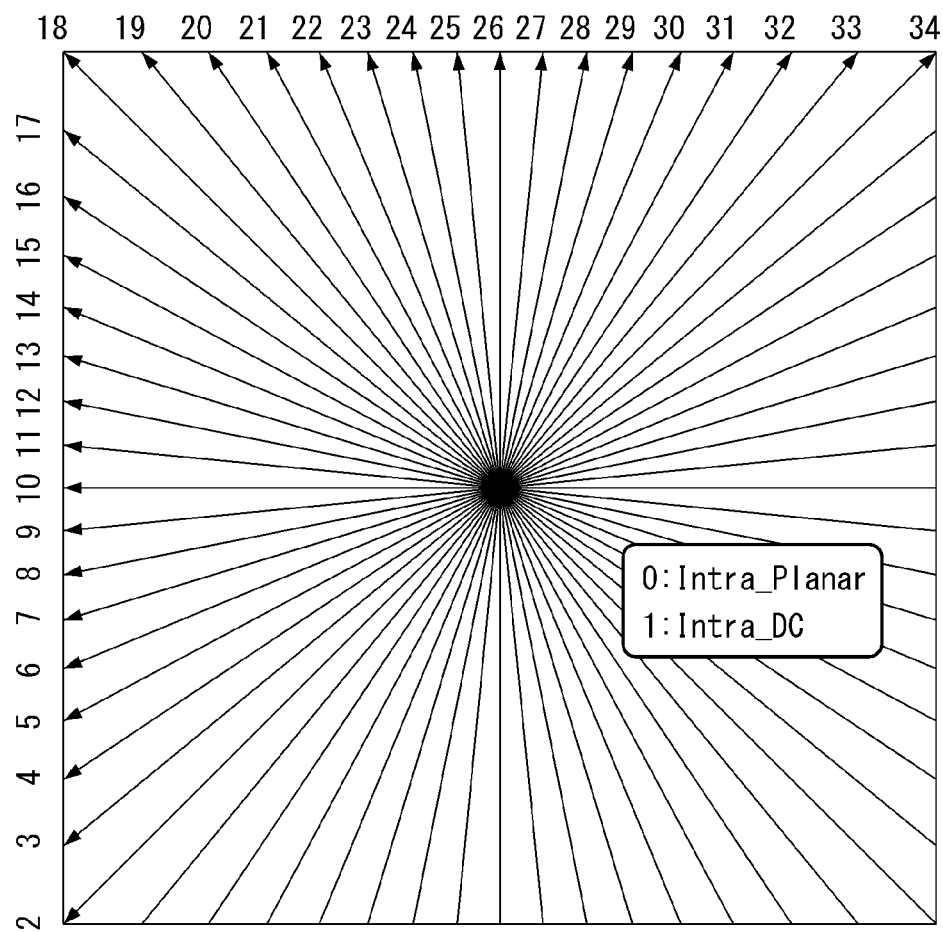

[Fig. 7]
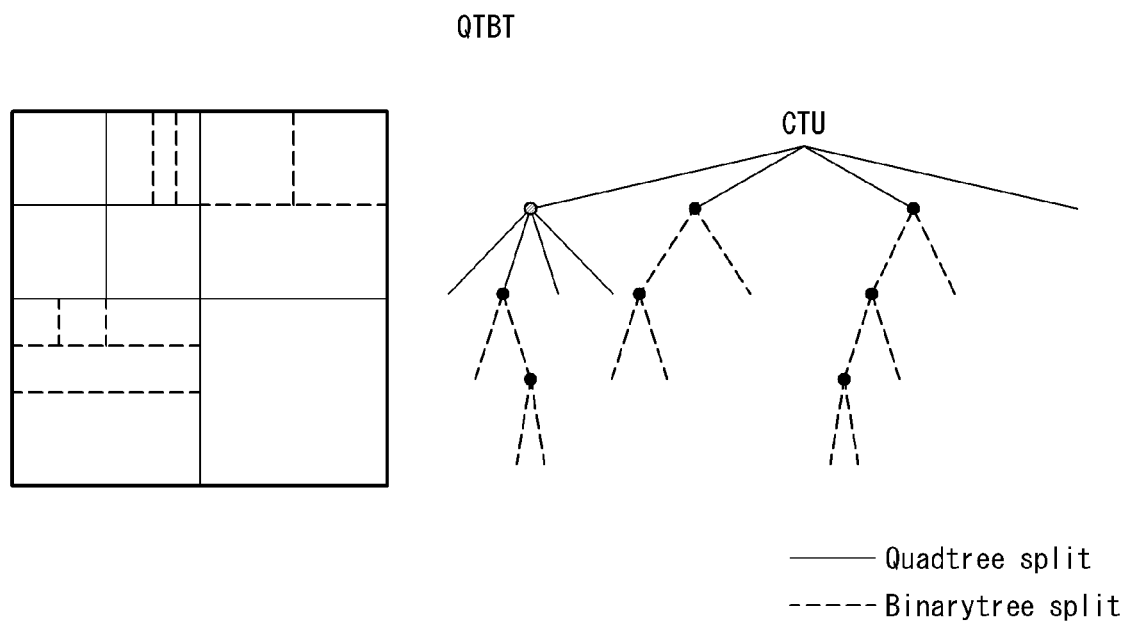

[Fig. 8]
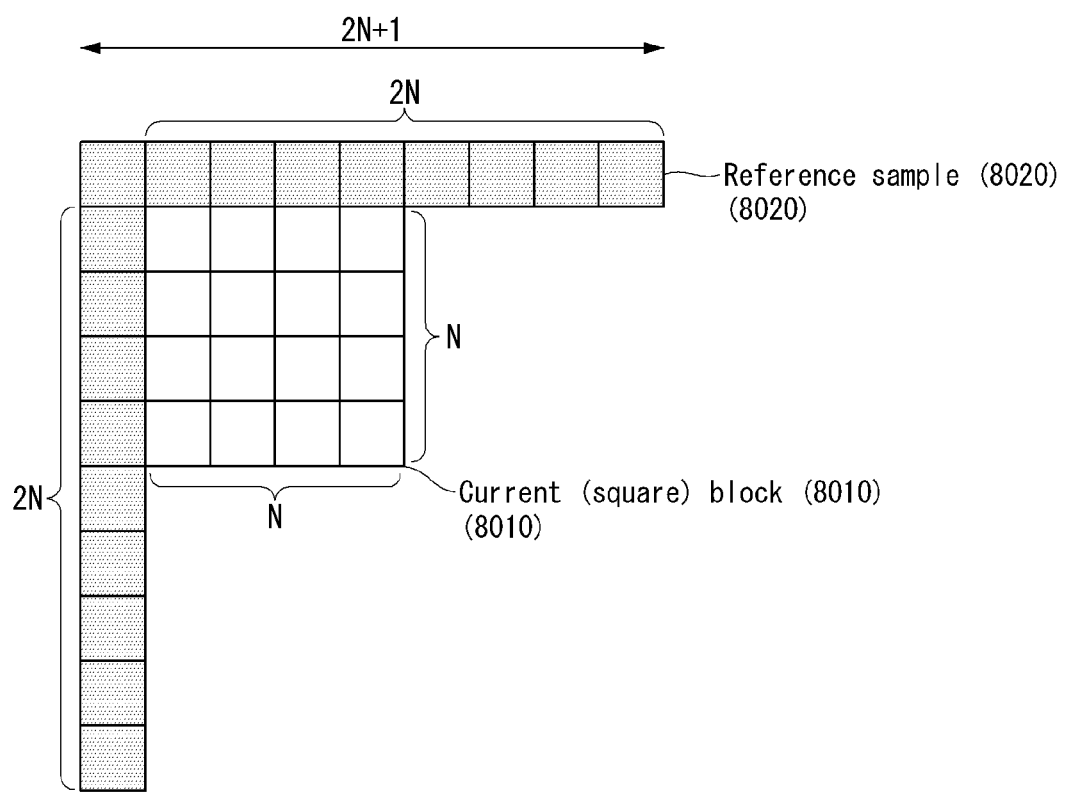

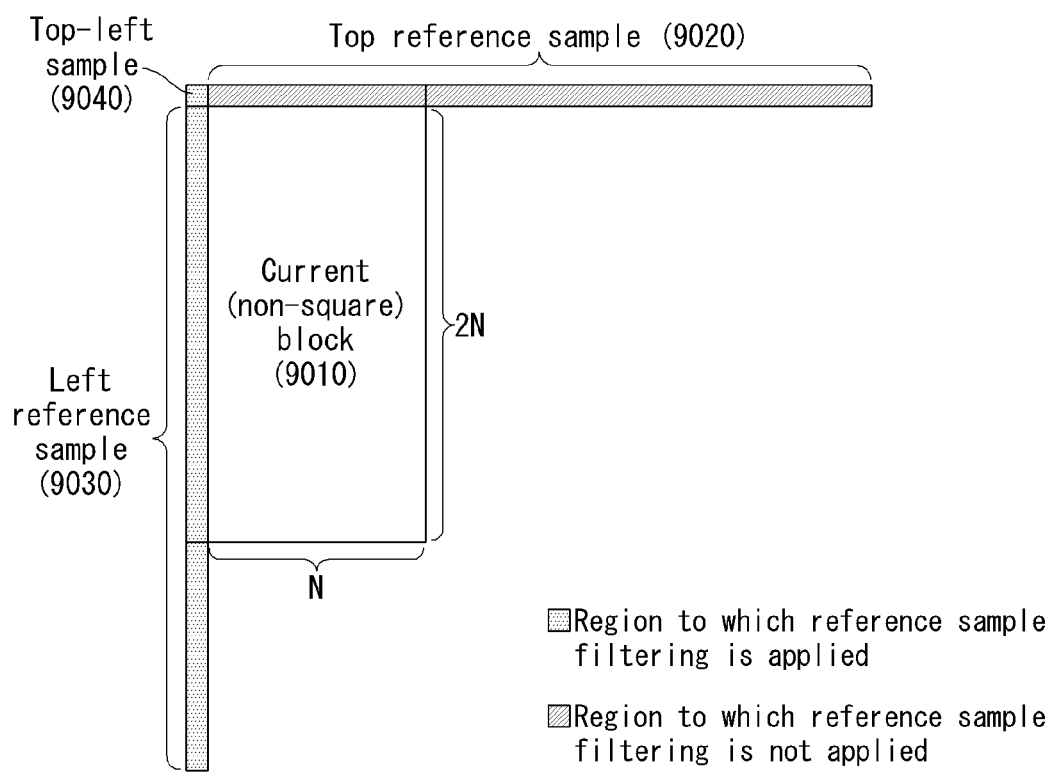
[Fig. 9]

[Fig. 10]
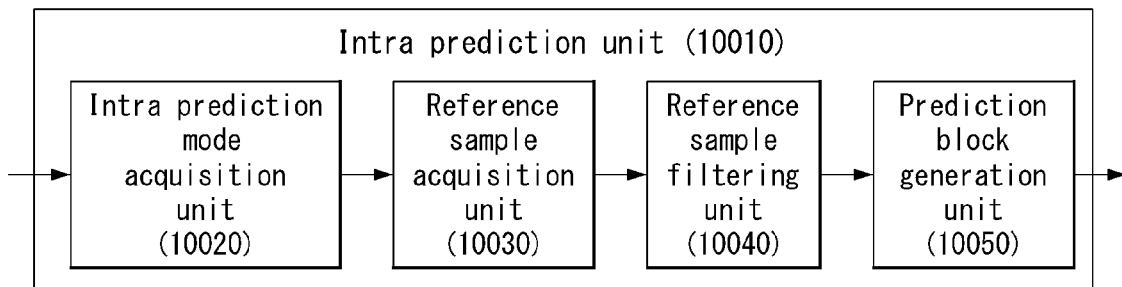

[Fig. 11]
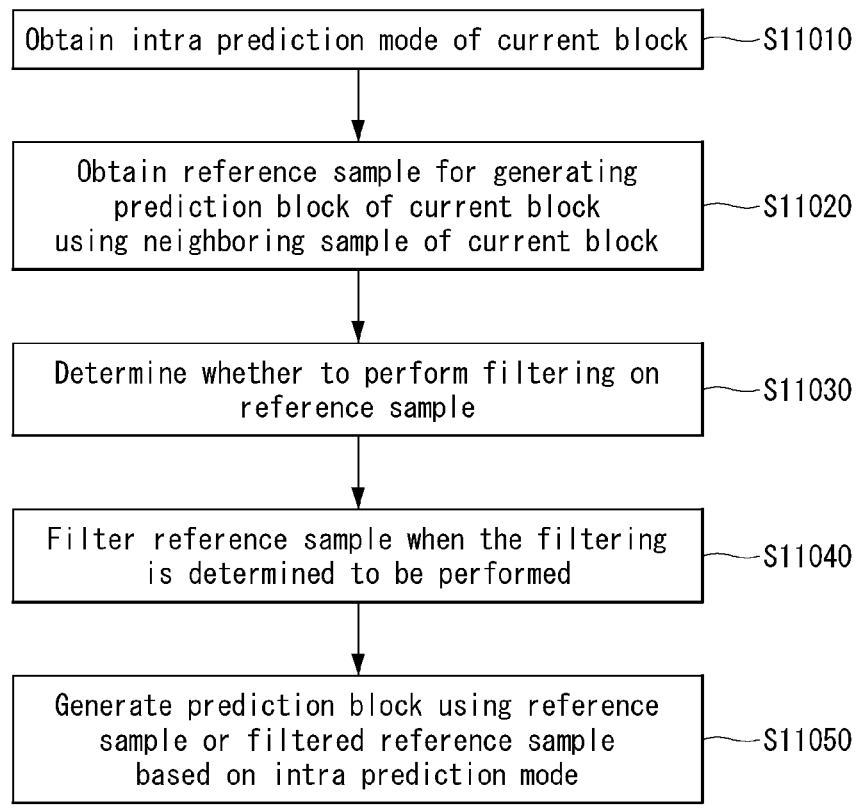

IMAGE PROCESSING METHOD AND APPARATUS THEREFOR

CROSS-REFERENCE TO RELATED APPLICATIONS

This application is the National Stage filing under 35 U.S.C. 371 of International Application No. PCT/KR2017/010778, filed on Sep. 28, 2017, which claims the benefit of U.S. Provisional Applications No. 62/401,898, filed on Sep. 30, 2016, the contents of which are all hereby incorporated by reference herein in their entirety.

TECHNICAL FIELD

The present invention relates to a method for processing a still image or moving image and, more particularly, to a method for encoding/decoding a still image or moving image based on an intra-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

In the existing still image or moving image compression technology, a method of compressing video based on a block is used. Specifically, in an intra prediction mode, when a current processing block is a non-square block, there is a problem in that a criterion for determining whether to perform reference sample filtering and/or a filter type is ambiguous.

In order to solve the problem, an object of the present invention is to provide a method and apparatus capable of improving prediction accuracy by determining whether to perform reference sample filtering and/or a filtering type using a parameter related to a current block and/or a parameter related to a peripheral block of the current block.

Furthermore, an object of the present invention is to provide a method and apparatus for determining whether to perform filtering and/or a filter type based on the length of a side of a current block, the number of samples, a quantization parameter or the distance between a prediction sample and a reference sample as a current block parameter.

Furthermore, an object of the present invention is to provide a method and apparatus for determining whether to perform filtering and/or a filter type based on the quantization parameter of a peripheral block, the number of residual coefficients, a flag indicating whether a residual coefficient is present or not or block boundary-related information as a parameter of the peripheral block.

Furthermore, an object of the present invention is to provide a method and apparatus for determining whether or not filtering for a top reference sample and a left reference sample is separately possible or for determining whether reference is possible before whether to perform filtering is determined.

Furthermore, an object of the present invention is to provide a method and apparatus for determining whether to perform filtering on a non-square block and/or a filter type using the table of square blocks without defining a separate table for a non-square block.

Technical objects to be achieved in the present invention are not limited to the above-described technical objects, and other technical objects not described above may be evidently understood by a person having ordinary skill in the art to which the present invention pertains from the following description.

Technical Solution

In an aspect of the present invention, a video decoding method includes obtaining an intra prediction mode of a current block; obtaining a reference sample for generating a prediction block of the current block using a neighboring sample of the current block; determining whether to perform filtering on the reference sample; filtering the reference sample when the filtering is determined to be performed; and generating the prediction block using the reference sample or the filtered reference sample based on the intra prediction mode. The current block is a non-square block, the reference sample includes a left reference sample including samples positioned on the left and bottom left of a left vertical edge of the current block and a top reference sample including samples positioned on the top and top right of a top horizontal edge of the current block, and one of the left reference sample and the top reference sample includes a top-left sample of the current block. In the step of determining whether to perform the filtering, whether to perform the filtering is determined based on at least one of a current block parameter, which is a parameter related to the current block, or a peripheral block parameter, which is a parameter related to a peripheral block of the current block, along with the intra prediction mode.

Preferably, the current block parameter includes at least one of a horizontal edge length indicating the length of a horizontal edge of the current block or a vertical edge length indicating the length of a vertical edge of the current block. In the step of determining whether to perform the filtering, the filtering is determined to be performed based on the length of an edge having a greater value or the length of an edge having a smaller value among the horizontal edge length and the vertical edge length.

Preferably, in the step of determining whether to perform the filtering, whether to perform filtering on the top reference sample is determined based on the horizontal edge length and whether to perform filtering on the left reference sample is determined based on the vertical edge length. In the step of filtering, the top reference sample and the left reference sample are independently filtered.

Preferably, the current block parameter includes a sample number of the current block. In the step of determining whether to perform the filtering, the filtering is determined to be performed on a first square block having a sample number identical with the sample number or a second square block, which is the greatest block of square blocks having a sample number smaller than the sample number, when the filtering is performed in the intra prediction mode based on a pre-defined condition.

Preferably, the current block parameter includes a first quantization parameter related to a quantization rate of the current block. In the step of determining whether to perform the filtering, the filtering is determined to be performed when the first quantization parameter is greater than a first threshold. In the step of filtering, a filter type is determined depending on whether the first quantization parameter is greater than the first threshold.

Preferably, the current block parameter includes at least one of a vertical distance between a prediction sample within the current block and the top reference sample or a horizontal distance between the prediction block and the left reference sample. In the step of determining whether to perform the filtering, the filtering is determined to be performed when the vertical distance is greater than a second threshold, when the horizontal distance is greater than a third threshold or when the vertical distance is greater than the second threshold and the horizontal distance is greater than the third threshold. In the step of filtering, a filter type is determined depending on whether the vertical distance is greater than the second threshold and/or when the horizontal distance is greater than the third threshold.

Preferably, the peripheral block parameter includes a second quantization parameter related to a quantization rate of the peripheral block. In the step of determining whether to perform the filtering, the filtering is determined to be performed when the second quantization parameter is greater than a fourth threshold. In the step of filtering, a filter type is determined depending on whether the second quantization parameter is greater than the fourth threshold.

Preferably, the peripheral block parameter includes the number of residual coefficients of the peripheral block. In the step of determining whether to perform the filtering, the filtering is determined to be performed when the number of residual coefficients is greater than a fifth threshold. In the step of filtering, a filter type is determined depending on whether the number of residual coefficients is greater than the fifth threshold.

Preferably, the peripheral block parameter includes a flag indicating whether a residual coefficient is present in the peripheral block. In the step of determining whether to perform the filtering, the filtering is determined to be performed when the flag indicates that the residual coefficient is present.

Preferably, the peripheral block parameter includes an edge parameter indicating whether at least one of the top reference sample or the left reference sample is configured with samples belonging to different peripheral blocks. In the step of determining whether to perform the filtering, the filtering is determined to be performed when the edge parameter indicates that at least one of the top reference sample or the left reference sample is configured with samples belonging to the different peripheral samples.

Preferably, the peripheral block parameter includes the number of different peripheral samples to which the reference sample belongs. In the step of determining whether to perform the filtering, the filtering is determined to be performed when the number of different peripheral samples is greater than a sixth threshold. In the step of filtering, a filter type is determined depending on whether the number of different peripheral samples is greater than the sixth threshold.

Preferably, the video decoding method further includes confirming whether the top reference sample and the left reference sample are referenceable. In the step of determining whether to perform the filtering, if one of the top reference sample and the left reference sample is referenceable, the filtering is determined to be performed based on the length of an edge neighboring a referenceable sample among a horizontal edge length indicating the length of a horizontal edge of the current block or a vertical edge length indicating the length of a vertical edge of the current block, and otherwise, the filtering is determined to be performed based on the length of an edge having a greater value or the length of an edge having a smaller value among the horizontal edge length and the vertical edge length or whether to perform filtering on the top reference sample and the left reference sample are independently determined based on the horizontal edge length and the vertical edge length.

In an aspect of the present invention, an apparatus for decoding video includes an intra prediction unit configured to generate a prediction block of a current block based on an intra prediction mode. The intra prediction unit includes an intra prediction mode acquisition unit configured to obtain the intra prediction mode of the current block; a reference sample acquisition unit configured to obtain a reference sample for generating the prediction block; a reference sample filtering unit configured to determine whether to perform filtering on the reference sample and to filter the reference sample when the filtering is determined to be performed; and a prediction block generation unit configured to generate the prediction block using the reference sample of the current block or the filtered reference sample. The current block is a non-square block. The reference sample includes a left reference sample including samples positioned on a left and bottom left of a left vertical edge of the current block and a top reference sample including samples positioned on the top and top right of a top horizontal edge of the current block, and one of the left reference sample and the top reference sample includes a top-left sample of the current block. In the step of determining whether to perform the filtering, whether to perform the filtering is determined based on at least one of a current block parameter, which is a parameter related to the current block, or a peripheral block parameter, which is a parameter related to a peripheral block of the current block, along with the intra prediction mode.

Advantageous Effects

In accordance with an embodiment of the present invention, prediction accuracy can be improved by determining whether to perform reference sample filtering and a filtering type using at least one of a current block parameter, that is, a parameter related to a current block, or a peripheral block parameter, that is, a parameter related to a peripheral block, when the current block is a non-square block.

Furthermore, in accordance with an embodiment of the present invention, a pre-defined table for a square block is used in a process of determining whether to perform reference sample filtering and a filtering type. Accordingly, additional memory consumption of the encoder/decoder can be reduced because it is not necessary to store a separate table for a non-square block.

Furthermore, in accordance with an embodiment of the present invention, prediction performance in a block having artifacts mixed therein or a block of a detailed image can be improved because a current block parameter (the length of a side, a quantization parameter, the number of samples or the distance between a prediction sample and a reference sample) and/or a peripheral block parameter (a quantization parameter, the number of residual coefficients, whether a residual coefficient is present (Cbf) or boundary-related information) is used.

Furthermore, in accordance with an embodiment of the present invention, prediction performance can be further improved because a current block parameter and a peripheral block parameter are combined and used.

Furthermore, in accordance with an embodiment of the present invention, prediction performance can be further improved because whether to perform filtering a top reference sample and a left reference sample and a filtering type are independently determined.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention is applied and is a diagram illustrating an intra-prediction method.

FIG. 6 illustrates a prediction direction according to an intra-prediction mode.

FIG. 7 is an embodiment to which the present invention is applied and is a diagram for illustrating a quadtree binarytree (hereinafter referred to as a "QTBT") block split structure.

FIG. 8 shows a current processing block and reference samples for generating a prediction block of the current processing block when the current processing block is a square block according to an embodiment of the present invention.

FIG. 9 shows a current processing block and reference samples for generating a prediction block of the current processing block when the current processing block is a non-square block according to an embodiment of the present invention.

FIG. 10 is a block diagram of the intra prediction unit according to an embodiment of the present invention.

FIG. 11 shows a flowchart of a video decoding method according to an embodiment of the present invention.

MODE FOR INVENTION

Hereinafter, preferred embodiments of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "block" or "unit" means a unit by which an encoding/decoding process, such as prediction, transform and/or quantization, is performed, and may be configured with a multi-dimensional array of samples (or picture elements, pixels).

A "block" or "unit" may mean a multi-dimensional array of samples for a luma component and may mean a multi-dimensional array of samples for a chroma component. Furthermore, a "block" or "unit" may generally refer to both a multi-dimensional array of samples for a luma component and a multi-dimensional array of samples for a chroma component.

For example, a "block" or "unit" may be interpreted as a meaning, including all of a coding block (CB) meaning the array of samples, that is, a target on which encoding/decoding will be performed, a coding tree block (CTB) configured with a plurality of coding blocks, a prediction block (PB) (or prediction unit (PU) meaning the array of samples to which the same prediction is applied, and a transform block (TB) (or transform unit (TU)) meaning the array of samples to which the same transform is applied.

Furthermore, unless described otherwise in this specification, a "block" or "unit" may be interpreted as a meaning, including a syntax structure used in a process of encoding/decoding the array of samples for a luma component and/or a chroma component. In this case, the syntax structure means 0 or more syntax elements present within a bit stream in a specific sequence. The syntax element means the element of data represented within the bit stream.

For example, a "block" or "unit" may be interpreted as a meaning, including all of a coding unit (CU) including a coding block (CB) and a syntax structure used for the encoding of a corresponding coding block (CB), a coding tree unit (CTU) configured with a plurality of coding units, a prediction unit (PU) including a prediction block (PB) and a syntax structure used for the prediction of a corresponding prediction block (PB), and a transform unit (TU) including a transform block (TB) and a syntax structure used for the transform of a corresponding transform block (TB).

Furthermore, in this specification, a "block" or "unit" is not essentially limited to the array of samples (or picture elements, pixels) of a square or rectangular form, and may mean the array of samples (or picture elements, pixels) of a polygonal form having three or more vertexes. In this case, the "block" or "unit" may also be called a polygon block or a polygon unit.

Furthermore, hereinafter, in this specification, a pixel or picture element is generally called a sample. Furthermore, to use a sample may mean to use a pixel value or picture element value.

Furthermore, hereinafter, a current block to which a technology proposed in this specification is applied indicates a non-square block unless described otherwise.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DOT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Furthermore, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of a 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of a 32×32 size and to generate the minimum rate distortion value for each 32×32 CU.

3) The optimal split structure of a PU and TU is determined to further split the 32×32 CU into four CUs of a 16×16 size and to generate the minimum rate distortion value for each 16×16 CU.

4) The optimal split structure of a PU and TU is determined to further split the 16×16 CU into four CUs of a 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconfigure a current processing unit on which decoding is performed, a decoded part of a current picture or other pictures including the current processing unit may be used.

A picture (slice) using only a current picture for reconstruction, that is, on which only intra prediction is performed, may be called an intra picture or I picture (slice). A picture (slice) using a maximum of one motion vector and reference index in order to predict each unit may be called a predictive picture or P picture (slice). A picture (slice) using a maximum of two motion vectors and reference indices may be called a bi-predictive picture or B picture (slice).

Intra prediction means a prediction method of deriving a current processing block from a data element (e.g., a sample value) of the same decoded picture (or slice). That is, intra prediction means a method of predicting a pixel value of a current processing block with reference to reconstructed areas within a current picture.

Inter prediction means a prediction method of deriving a current processing block based on a data element (e.g., a sample value or a motion vector) of a picture other than a current picture. That is, inter prediction means a method of predicting a pixel value of a current processing block with reference to reconstructed areas within another reconstructed picture other than a current picture.

Hereinafter, intra prediction is described more specifically.

Intra Prediction (or Prediction within Frame)

FIG. 5 is an embodiment to which the present invention is applied and is a diagram illustrating an intra prediction method.

Referring to FIG. 5, the decoder derives an intra prediction mode of a current processing block (S501).

Intra prediction may have a prediction direction for the position of a reference sample used for prediction depending on a prediction mode. An intra prediction mode having a prediction direction is referred to as an intra-angular prediction mode (Intra_Angular prediction mode). In contrast, an intra prediction mode not having a prediction direction includes an intra planar (INTRA_PLANAR) prediction mode and an intra DC (INTRA_DC) prediction mode.

Table 1 illustrates intra-prediction modes and associated names.

TABLE 1

| INTRA-PREDICTION MODE | ASSOCIATED NAMES |
|---|---|
| 0 | Intra-planar (INTRA_PLANAR) |
| 1 | Intra-DC (INTRA_DC) |
| 2 . . . , 34 | intra-angular 2 . . . , intra-angular 34 (INTRA_ANGULAR2 . . . , INTRA_ANGULAR34) |

In intra-prediction, prediction is performed on a current processing block based on a derived prediction mode. A reference sample used for prediction and a detailed prediction method are different depending on a prediction mode. If a current block is an intra-prediction mode, the decoder derives the prediction mode of a current block in order to perform prediction.

The decoder checks whether neighboring samples of the current processing block can be used for prediction and constructs reference samples to be used for the prediction (S502).

In intra-prediction, neighboring samples of the current processing block mean a sample neighboring the left boundary of current processing block of an nS×nS size, a total of 2× nS samples neighboring a bottom left of the current processing block, a sample neighboring the top boundary of the current processing block, a total of 2× nS samples neighboring the top right of the current processing block, and one sample neighboring the top left of the current processing block.

However, some of the neighboring samples of the current processing block have not yet been coded or may not be available. In this case, the decoder may construct reference samples to be used for prediction by substituting unavailable samples with available samples.

The decoder may perform filtering on the reference samples based on the intra-prediction mode (S503).

Whether to perform the filtering of the reference samples may be determined based on the size of the current processing block. Furthermore, the filtering method of the reference samples may be determined based on a filtering flag transferred by the encoder.

The decoder generates a prediction block for the current processing block based on the intra prediction mode and the reference samples (S504). That is, the decoder generates a prediction block for the current processing block (i.e., generates a prediction sample within the current processing block) based on the intra prediction mode derived in the intra prediction mode derivation step (S501) and the reference samples obtained in the reference sample configuration step (S502) and the reference sample filtering step (S503).

If a current processing block has been encoded in the INTRA_DC mode, in order to minimize the discontinuity of the boundary between processing blocks, a left boundary sample (i.e., a sample within a prediction block neighboring a left boundary) and top boundary sample (i.e., a sample within a prediction block neighboring a top boundary) of the prediction block may be filtered at step S504.

Furthermore, at step S504, with respect to the vertical mode and horizontal mode of intra-angular prediction modes, as in the INTRA_DC mode, filtering may be applied to a left boundary sample or a top boundary sample.

More specifically, if a current processing block has been encoded in the vertical mode or horizontal mode, a value of a prediction sample may be derived based on a value of a reference sample positioned in the prediction direction. In this case, a boundary sample not positioned in the prediction direction among a left boundary sample or top boundary sample of a prediction block may neighbor a reference sample not used for prediction. That is, the distance from a reference sample not used for prediction may be much closer than the distance from a reference sample used for prediction.

Accordingly, the decoder may adaptively apply filtering to left boundary samples or top boundary samples depending on whether an intra prediction direction is a vertical direction or a horizontal direction. That is, the decoder may apply filtering to left boundary samples if the intra prediction direction is a vertical direction, and may apply filtering to top boundary samples if the intra prediction direction is a horizontal direction.

FIG. 6 illustrates prediction directions according to intra prediction modes.

As described above, in HEVC, a prediction block of a current block is generated using a total of 35 prediction methods, including 33 angular prediction method and 2 non-angular prediction method for intra prediction.

In the case of the 33 angular prediction mode, when a prediction sample is computed from reference samples, a reference sample value is copied to a corresponding prediction sample by taking directivity into consideration.

In contrast, in each of a DC mode and a planar mode, that is, the 2 non-angular prediction methods, a prediction sample is computed as an average value and weighting sum of neighboring reference samples.

FIG. 7 is an embodiment to which the present invention is applied and is a diagram for illustrating a quadtree binarytree (hereinafter referred to as a "QTBT") block split structure.

Quad-Tree Binary-Tree (QTBT)

A QTBT refers to a structure of a coding block in which a quadtree structure and a binarytree structure have been combined. Specifically, in a QTBT block split structure, an image is coded in a CTU unit. A CTU is split in a quadtree form. A leaf node of a quadtree is additionally split in a binarytree form.

Hereinafter, a QTBT structure and a split flag syntax supporting the same are described with reference to FIG. 7.

Referring to FIG. 7, a current block may be split in a QTBT structure. That is, a CTU may be first hierarchically split in a quadtree form. Furthermore, a leaf node of the quadtree that is no longer spit in a quadtree form may be hierarchically split in a binarytree form.

The encoder may signal a split flag in order to determine whether to split a quadtree in a QTBT structure. In this case, the quadtree split may be adjusted (or limited) by a MinQTLumaISlice, MinQTChromaISlice or MinQTNonISlice value. In this case, MinQTLumaISlice indicates a minimum size of a quadtree leaf node of a luma component in an I-slice. MinQTLumaChromaISlice indicates a minimum size of a quadtree leaf node of a chroma component in an I-slice. MinQTNonISlice indicates a minimum size of a quadtree leaf node in a non-I-slice.

In the quadtree structure of a QTBT, a luma component and a chroma component may have independent split structures in an I-slice. For example, in the case of an I-slice in the QTBT structure, the split structures of a luma component and chroma component may be differently determined. In order to support such a split structure, MinQTLumaISlice and MinQTChromaISlice may have different values.

For another example, in a non-I-slice of a QTBT, the split structures of a luma component and chroma component in the quadtree structure may be identically determined. For example, in the case of a non-I-slice, the quadtree split structures of a luma component and chroma component may be adjusted by a MinQTNonISlice value.

In a QTBT structure, a leaf node of the quadtree may be split in a binarytree form. In this case, the binarytree split may be adjusted (or limited) by MaxBTDepth, MaxBTDepthISliceL and MaxBTDepthISliceC. In this case, MaxBTDepth indicates a maximum depth of the binarytree split based on a leaf node of the quadtree in a non-I-slice. MaxBTDepthISliceL indicates a maximum depth of the binarytree split of a luma component in an I-slice. MaxBTDepthISliceC indicates a maximum depth of the binarytree split of a chroma component in the I-slice.

Furthermore, in the I-slice of a QTBT, MaxBTDepthISliceL and MaxBTDepthISliceC may have different values in the I-slice because a luma component and a chroma component may have different structures.

In the case of the split structure of a QTBT, the quadtree structure and the binarytree structure may be used together. In this case, the following rule may be applied.

First, MaxBTSize is smaller than or equal to MaxQTSize. In this case, MaxBTSize indicates a maximum size of a binarytree split, and MaxQTSize indicates a maximum size of the quadtree split.

Second, a leaf node of a QT becomes the root of a BT.

Third, once a split into a BT is performed, it cannot be split into a QT again.

Fourth, a BT defines a vertical split and a horizontal split.

Fifth, MaxQTDepth, MaxBTDepth are previously defined. In this case, MaxQTDepth indicates a maximum depth of a quadtree split, and MaxBTDepth indicates a maximum depth of a binarytree split.

Sixth, MaxBTSize, MinQTSize may be different depending on a slice type.

FIG. 8 shows a current processing block and reference samples for generating a prediction block of the current processing block when the current processing block is a square block according to an embodiment of the present invention.

Referring to FIG. 7, in the QTBT split structure, a current processing block (coding block) may correspond to a square block or a non-square block. The square block is a square block having the same width length and height length. The non-square block is a rectangular block having a different width length and height length. Hereinafter, a case where a current processing block is a square block is first described.

In FIG. 8, a current processing block (hereinafter referred to as a current block, for convenience sake) 8010 is a square block having an N×N size. For example, in the block shown in FIG. 8, N corresponds to 4.

Referenceable reference samples 8020 when intra prediction is performed include neighboring samples of the current block 8010. Referring to FIG. 8, when the size of the current block 8010 is N×N, the reference samples 8020 may include 2N samples at the top of the current block 8010, 2N samples on the left of the current block 8010, and 1 sample on the top left of the current block 8010. That is, the reference samples 8020 may include a maximum of 4N+1 samples. In some cases, if all of the peripheral reference samples 8020 are not present, all the reference samples 8020 may be filled with a middle value of a pixel value range that may be represented. Furthermore, if only some of the peripheral reference samples 8020 are available, padding for substituting an unavailable sample with an available sample may be performed.

In intra prediction, the reference sample 8020 corresponds to a reconstructed sample because it is reconstructed after quantization is performed on the reference sample. Accordingly, the reference sample 8020 includes a quantization error. In order to reduce a prediction error attributable to a quantization error, reference sample filtering (or intra smoothing) may be performed. The reference sample filtering can prevent a potential visual artifact of a prediction block to be derived due to a difference between samples. To this end, a low pass filter may be used.

Whether filtering will be performed on the reference sample 8020 is first determined before prediction is performed based on the size of the current block 8010, a prediction mode and a pixel value. Table 2 below shows whether to perform (apply) filtering according to the sizes of the current block 8010 (or prediction block) and intra prediction modes in the encoder/decoder. Table 2 below may be previously defined in the encoder/decoder.

TABLE 2

|    | 4 × 4 | 8 × 8 | 16 × 16 | 32 × 32 |
|----|-------|-------|---------|---------|
| 0  | X | X | O | O |
| 1  | X | X | X | X |
| 2  | X | O | O | O |
| 3  | X | X | O | O |
| 4  | X | X | O | O |
| 5  | X | X | O | O |
| 6  | X | X | O | O |
| 7  | X | X | O | O |
| 8  | X | X | O | O |
| 9  | X | X | X | O |
| 10 | X | X | X | X |
| 11 | X | X | X | O |
| 12 | X | X | O | O |
| 13 | X | X | O | O |
| 14 | X | X | O | O |
| 15 | X | X | O | O |
| 16 | X | X | O | O |
| 17 | X | X | O | O |
| 18 | X | O | O | O |
| 19 | X | X | O | O |
| 20 | X | X | O | O |
| 21 | X | X | O | O |
| 22 | X | X | O | O |
| 23 | X | X | O | O |
| 24 | X | X | O | O |
| 25 | X | X | X | O |
| 26 | X | X | X | X |
| 27 | X | X | X | O |
| 28 | X | X | O | O |
| 29 | X | X | O | O |
| 30 | X | X | O | O |
| 31 | X | X | O | O |
| 32 | X | X | O | O |
| 33 | X | X | O | O |
| 34 | X | O | O | O |

In Table 2, numbers 0 to 34 in a vertical axis indicate intra prediction modes, and 4×4, 8×8, 16×16 and 32×32 in a horizontal axis indicate the size of the current block 8010.

Referring to Table 2, in a DC mode (mode 1), a horizontal mode (mode 10) and a vertical mode (mode 26), filtering is not always performed regardless of the size of the current block 8010. In the case of the DC mode, the reference sample 8020 is not filtered in order to prevent the distortion of a value of the reference sample attributable to filtering.

In a block (e.g., 4×4 or 8×8) having a small size, filtering is performed only in very limited prediction modes. As the size of a block increases, a restriction on filtering is reduced. If the size of a block is sufficiently large (e.g., 32×32), filtering may be performed in all modes other than the DC mode, the horizontal mode (mode 10) and the vertical mode (mode 26). Furthermore, a filter type may be determined based on the size of a prediction block, a prediction mode and a value of the reference sample 8020.

A prediction block of the current block 8010 is generated using the reference samples 8020 of the current block 8010. Thereafter, the decoder reconstructs the current block 8010 by combining the prediction block and a received residual signal.

FIG. 9 shows a current processing block and reference samples for generating a prediction block of the current processing block when the current processing block is a non-square block according to an embodiment of the present invention.

In FIG. 9, a current block is a non-square block 9010. As described in the description regarding FIGS. 7 and 8, in a QTBT split structure, a current processing block may correspond to a non-square block. For example, the non-square block 9010 may have a 2N×N or 2N×hN (h=half) size. Furthermore, as described in the description regarding FIG. 8, in a square block, whether filtering will be performed on a reference sample is determined according to Table 2 based on the size of a current block (i.e., the length of one side N). However, the non-square block 9010 is different in the width length and height length of the block. Accordingly, in the case of the non-square block 9010, whether to perform filtering according to Table 2 based on the length of which side is ambiguous because the lengths of both sides are different unlike in a square block.

First, a reference sample of the non-square block 9010 is described. The reference sample includes a top (upper) reference sample 9020 and a left reference sample 9030. The top reference sample 9020 may also be called an upper boundary sample, and the left reference sample 9030 may also be called a left boundary sample.

The top reference sample 9020 is a reference sample neighboring the top of the current block. The top reference sample 9020 includes samples positioned on the upper (top) and upper-right side of the top horizontal edge (i.e., upper horizontal side) of the current block. For example, when the location of a top-left sample 9040 is [X][Y]=[−1][−1], the top reference samples 9020 have a location of [X][−1]. That is, the top reference samples 9020 neighbor to the upper side of the current block and the reference samples are arranged horizontally.

The left reference sample 9030 is a reference sample neighboring the left of the current block. The left reference sample 9030 includes samples positioned on the left and bottom left of the left vertical edge (i.e., left vertical side) of the current block. For example, when the location of the top-left sample 9040 is [X][Y]=[−1][−1], the left reference sample 9030 has a location of [−1][y]. That is, the left reference samples 9030 neighbor the left of the current block, and the reference samples are arranged vertically.

The length of the top reference sample 9020 and the left reference sample 9030 may be determined as a proper length based on the current block and a peripheral block. For example, when the current block has a 2N×N size, a maximum length of the top/left reference sample may have a length of 4N, that is, twice the length of a side. Furthermore, the top reference sample 9020 and the left reference sample 9030 may have different lengths.

In this case, the top-left sample 9040 may be included in one of the top reference sample 9020 or the left reference sample 9030 and processed. For example, FIG. 9 shows that the top-left sample 9040 is included in the left reference sample 9030. The top-left sample 9040 may be included in the top reference sample 9020 and processed.

Referring to the description related to FIG. 5, a prediction block is generated using a reference sample. Intra prediction for reconstructs video using the generated prediction block may be performed by the intra prediction unit. Specifically, the intra prediction unit may obtain an intra prediction mode of a current block (refer to S501), and may obtain a reference sample for generating a prediction block of the current block using a neighboring sample of the current block (refer to S502). Thereafter, the intra prediction unit may determine whether to perform filtering on the reference sample. When the filtering is determined to be performed, the intra prediction unit may filter the reference sample (refer to S503). Thereafter, the intra prediction unit may generate a prediction block a not-filtered reference sample or the filtered reference sample (refer to S504).

A criterion for determining whether to perform reference sample filtering of the non-square block 9010 and a filter type is described below. A filtering procedure may be performed in the same manner as the existing HEVC filtering method in addition to a method of determining whether to perform filtering/filter type. In the decoder (video decoding apparatus), an intra prediction mode may be transmitted by the encoder as a factor.

In the following embodiments, in a process of determining whether to perform filtering and determining a filter type by the intra prediction unit, a current block parameter and/or a peripheral block parameter is used along with an intra prediction mode. The current block parameter is a parameter related to a current block. The peripheral block parameter is a parameter related to peripheral blocks of a current block.

The current block parameter includes (i) the length of a side (horizontal edge or vertical edge) of a current block, (ii) the number of samples (pixels) of a current block, (iii) the quantization rate (QP) of a current block and/or (iv) distance information between a prediction sample and a reference sample.

The peripheral block parameter includes (i) the quantization rate (QP) of a peripheral block, (ii) peripheral block-related information of a residual coefficient, (iii) boundary/edge-related information of a peripheral block, and/or (iv) split information of a peripheral block.

Whether to perform filtering on a reference sample of the non-square block 9010 and/or a filter type may be determined using the following embodiments.

Embodiment 1: Use Length of Side of Current Block

In Embodiment 1, the intra prediction unit uses a current block parameter in a process of determining whether to perform filtering and/or a filter type. The current block parameter includes the length of a side of a current block. Furthermore, in Embodiment 1, a separate table is not defined in the process of determining whether to perform filtering, and Table 2 corresponding to a table related to a square block is used.

The current block parameter may include the horizontal side length (i.e., the length of a horizontal edge) and/or vertical side length (i.e., the length of a vertical edge) of a current block. That is, the intra prediction unit may determine whether to perform reference sample filtering based on a longer side (i.e., the length of an edge having a greater value) or a smaller side (i.e., the length of an edge having a smaller value) among the lengths of sides of a current block. The length of a side of a current block corresponds to the number of samples (picture elements or pixels) included in one side of the current block.

As a first method using a side length, the intra prediction unit may determine whether to perform filtering based on a longer length among the lengths of a horizontal side and a vertical side. For example, when the length of a horizontal side is 8, the length of a vertical side is 16, and a prediction mode is 14, whether to perform filtering is determined based on the same criterion as that of the case of the 16×16 block of Table 2 because a longer length is 16. That is, according to Table 2, filtering is performed on reference samples of the 8×16 block because reference sample filtering is performed in the prediction mode 14 with respect to the 16×16 block. For another example, when the length of a horizontal side is 32, the length of a vertical side is 8, and an prediction mode is 10, filtering is not performed on reference samples of the 32×8 block based on the 32×32 block of Table 2. If filtering is determined to be performed, a 1-dimensional binomial filter may be used as a smoothing filter. The 1-dimensional binomial filter may include a 1-2-1 filter or a 1-4-6-4-1 filter.

Referring to Table 2, the possibility that filtering will be performed increases as the size of a prediction block increases. Accordingly, if whether to perform filtering is determined based on the length of a large side, a reference sample may be further smoothed according to the rule that permits smoothing as the size of a block increases. Furthermore, if a current block is a noisy block and artifacts are mixed with a prediction sample, error propagation may be reduced.

As a second method using a side length, the intra prediction unit may determine whether to perform filtering based on a shorter length of the lengths of a horizontal side and a vertical side. For example, when the length of a horizontal side is 8, the length of a vertical side is 16, and a prediction mode is 14, whether to perform filtering is determined based on the same criterion as that of the 8×8 block of Table 2 because a shorter length is 8. That is, according to Table 2, filtering is not performed on reference samples of the 8×16 block because reference sample filtering is not performed in all the prediction modes with respect to the 8×8 block. For another example, when the length of a horizontal side is 32, the length of a vertical side is 8, and a prediction mode is 2, filtering is performed on reference samples of the 32×8 block according to the 8×8 block of Table 2. If the filtering is determined to be performed, a 1-dimensional binomial filter may be used as a smoothing filter. The 1-dimensional binomial filter may include a 1-2-1 filter or a 1-4-6-4-1 filter.

Referring to Table 2, the possibility that filtering will be performed decreases as the size of a prediction block decreases. Accordingly, if whether to apply filtering is determined based on a small side, a smoothing effect may be blocked according to the rule that the application of filtering is limited as the size of a block is smaller. Furthermore, if a complicated characteristic of a reference sample needs to be applied to a prediction block without any change, a more accurate prediction sample can be generated by lowering the filtering possibility.

In Embodiment 1, a separate table is not defined, and Table 2 related to a square block is used in the process of determining whether to perform filtering. If a separate table for whether to perform reference sample filtering of the non-square block 9010 is defined, additional memory is consumed in order to store the table.

Embodiment 1 can reduce memory of the encoder and the decoder because a separate additional table for the non-square block 9010 is not defined and a table for a square block is used in the process of determining whether to perform reference sample filtering of the non-square block 9010.

Embodiment 2: Use Number of Samples of Current Block

In Embodiment 2, the intra prediction unit uses a current block parameter in a process of determining whether to perform filtering and/or a filter type. The current block parameter includes the number of samples (pixels) of a current block. In Embodiment 2, as in Embodiment 1, Table 2 is used in the process of determining whether to perform filtering.

If a square block having the same number of samples as the number of samples included in a current block is present, whether to perform filtering is determined by applying the same criterion as that of the square block.

If a square block having the same number of samples as a current block is not present, whether to perform filtering is determined based on a block having the greatest size among square blocks having the number of samples smaller than the number of samples of the current block. That is, this is described according to a different method. If a square block having the same number of samples as a current block is not present, whether to perform filtering is determined based on the length of a smaller side of a current block (i.e., the same criterion as a square block corresponding to the length of the smaller side).

For example, when the length of an upper side of a current block is 8 and the length of a left side thereof is 32 (i.e., the current block is a 8×32 block), the number of samples included in the current block is the same as the number of samples included in a 16×16 block. Accordingly, in this case, the same criterion as that of the 16×16 block is applied to the current block. If a prediction mode is mode 14, reference sample filtering is performed on a 32×8 block, that is, the current block, because reference sample filtering is performed on the 16×16 block according to Table 2.

For another example, when the length of an upper side of a current block is 16 and the length of a left side thereof is 8 (i.e., the current block is a 16×8 block), a square block having the same number of samples as the current block is not present. The number of pixels of the 16×8 block is smaller than that of the 16×16 block and is larger than that of the 8×8 block. Accordingly, in this case, whether to perform reference sample filtering of the current block is determined based on the criterion of the 8×8 block. Referring to Table 2, when a prediction mode is 14, filtering is not performed on the reference samples of the 8×8 block. Accordingly, the reference sample filtering of the current block (16×8 block) is not performed.

If the filtering is determined to be performed, a 1-dimensional binomial filter may be used as a smoothing filter. The 1-dimensional binomial filter may include a 1-2-1 filter or a 1-4-6-4-1 filter.

Embodiment 3: Use Quantization Parameter of Current Block/Peripheral Block

In Embodiment 3, the intra prediction unit uses a parameter of a current block or a peripheral block in a process of determining whether to perform filtering and/or a filter type. The current/peripheral block parameter includes the quantization parameter of a current/peripheral block.

In quantization, input values of a specific range are mapped as a single representative value with respect to input data. For example, in the encoder, a residual block of a current block is transformed into a signal of a frequency region. Accordingly, a transform block can be obtained and the coefficient of a transform block (transform coefficient) can be quantized.

A quantization parameter (QP) is related to the quantization rate (QP_step) of a coding block. The quantization rate may be represented as a quantization range. As the quantization rate increases, the number of representative values that represents data is reduced. A data compression rate can be adjusted by changing the quantization rate. Since the quantization rate is a real number value, a quantization parameter, that is, an integer value, may be used instead of the quantization rate, for convenience of calculation. For example, the quantization parameter may have an integer value from 0 to 51, and the transform coefficient of a current block or a peripheral block may be quantized based on the integer value. The quantization parameter of each coding block may be transmitted from the encoder to the decoder. That is, the decoder may parse the quantization parameter of each coding block.

In Embodiment 3, whether to perform filtering on reference samples of a current block is determined based on the quantization parameter of the current block (hereinafter the QP of a current block) or the quantization parameter of a peripheral block (hereinafter the QP of a peripheral block). The QP includes both the QP of a current block and the QP of a peripheral block unless described otherwise hereinafter. The following method may be applied to both the QP of a current block and the QP of a peripheral block.

Specifically, when the QP of a current block or a peripheral block is greater than (or greater than or equal to) a threshold (QP threshold), the intra prediction unit may determine to perform reference sample filtering of the current block. Furthermore, if the intra prediction unit determines to perform the filtering, it may apply a strong smoothing filter, that is, a filter having strong filtering intensity.

If the QP of a current block or a peripheral block is smaller than (or smaller than or equal to) a threshold, the intra prediction unit may determine to not perform reference sample filtering of the current block. However, the intra prediction unit may determine to perform reference sample filtering when the QP is smaller than the threshold. In this case, the intra prediction unit may apply a weak smoothing filter, that is, a filter having weak filtering intensity.

A 1-dimensional binomial filter may be used as the weak smoothing filter. The 1-dimensional binomial filter may include a 1-2-1 filter or a 1-4-6-4-1 filter. An average filter or another type of linear/non-linear-weighting filters may be used as the strong smoothing filter.

A QP threshold may be determined as a value previously agreed between the encoder and the decoder. Furthermore, the threshold may be included in a VPS, SPS, PPS, slice header or block header and transmitted to the encoder. The decoder may determine whether to perform reference sample filtering and a filter type based on the received threshold.

A detailed characteristic of an image is better preserved because the number of representative values to represent data is increased as the QP is smaller. Accordingly, the accuracy of a prediction block can be improved by applying weak filtering to a fine or minute (i.e., a great change in the sample value within a block) image. Furthermore, many errors, such as a blocky artifact, occur because the number of representative values is reduced as the QP increases. Accordingly, in this case, the accuracy of a prediction block can be improved by applying strong filtering.

Embodiment 4: Use Residual Coefficient-Related Information of Peripheral Block

In Embodiment 4, a peripheral block parameter is used in a process of determining whether to perform filtering and/or a filter type. The peripheral block parameter includes residual coefficient-related information of a peripheral block. The residual coefficient-related information includes the number of residual coefficients of a peripheral block and/or a flag (coded block flag, Cbf) indicating whether a residual coefficient is present in a peripheral block.

Reference samples are configured with samples peripheral to a current block, which have already been decoded through encoding. Accordingly, each of peripheral blocks including a reconstructed reference sample includes a Cbf and a residual coefficient. Information of the Cbf and the residual coefficient is transmitted from the encoder to the decoder.

The residual coefficient indicates the coefficient of a transform block that has been quantized after a residual block is transformed into a frequency region. The residual block is a block obtained by subtracting a prediction block from the original coding block in the encoder. The Cbf is a flag indicating whether a residual coefficient is present in a peripheral block. That is, the Cbf indicates whether one or more coefficients (i.e., residual coefficients) are present in a block after the transform block of a peripheral block was quantized. For example, when the Cbf is 1, this may mean that a residual coefficient is present.

The intra prediction unit may determine to perform reference sample filtering when the Cbf of a peripheral block indicates that a residual coefficient is present, and may determine to not perform filtering when the Cbf of a peripheral block indicates that a residual coefficient is not present. That is, if a residual coefficient is present, this means that a reference sample used for prediction is complicated or may include noise. Accordingly, in this case, reference sample filtering may be performed in order to improve prediction accuracy. If the reference sample filtering is determined to be performed, strong filtering (strong smoothing filter) may be applied.

When the number of residual coefficients is greater than (or greater than or equal to) a threshold, the intra prediction unit may determine to not perform reference sample filtering. The reason for this is that if the number of residual coefficients is many, this indicates that the complexity of an image is great. In this case, strong filtering may be applied. Furthermore, when the number of residual coefficients is smaller than (or smaller than or equal to) a threshold, the intra prediction unit may determine to not perform filtering or may determine to apply filtering, but apply weak filtering (weak smoothing filter).

A 1-dimensional binomial filter may be used as the weak smoothing filter. The 1-dimensional binomial filter may include a 1-2-1 filter or a 1-4-6-4-1 filter. An average filter or another type of linear/non-linear-weighting filter may be used as the strong smoothing filter.

The threshold of the number of residual coefficients may be determined as a value previously agreed between the encoder and the decoder. Furthermore, the threshold may be included in a VPS, SPS, PPS, slice header or block header and transmitted from the encoder to the decoder. The decoder may determine whether to perform reference sample filtering and a filter type based on the received threshold.

If the residual of a peripheral block is reduced (i.e., the number of residual coefficients is reduced), this indicates that the homogeneity of a prediction block of the peripheral block and the original block is high. In this case, the intra prediction unit may generate a relatively accurate prediction block (predicted value) although it uses only a weak smoothing filter. However, as the residual of a peripheral block increases (i.e., the number of residual coefficients increases), an image of the peripheral block may be a detailed image or may include many errors, such as noise or artifacts. Accordingly, the intra prediction unit can improve the accuracy of a prediction block using a strong smoothing filter.

Embodiment 5: Use Boundary/Edge-Related Information of Peripheral Block

In Embodiment 5, a peripheral block parameter is used in a process of determining whether to perform filtering and/or a filter type. The peripheral block parameter indicates information related to the boundary or edge of a peripheral block.

A reference sample includes a plurality of samples. The plurality of samples belongs to different peripheral samples neighboring a current block. The boundary-related information includes a parameter (hereinafter referred to as a boundary parameter or edge parameter) indicating whether the boundary or edge of a peripheral block is included in a reference sample or the number of different peripheral samples (hereinafter a boundary sample number) including a block boundary within a reference sample.

The intra prediction unit may determine whether to perform reference sample filtering and/or a filter type based on an edge parameter. The edge parameter indicates whether the boundary of a peripheral block is included in a reference sample. That is, specifically, the edge parameter indicates whether at least one of the top reference sample 9020 or the left reference sample 9030 is configured with samples belonging to different peripheral samples. For example, when the edge parameter is 1, it may indicate that the boundary of a peripheral block is included in a reference sample.

When an edge parameter indicates that at least one of the top reference sample 9020 or the left reference sample 9030 is configured with samples belonging to different peripheral samples, the intra prediction unit may determine to perform reference sample filtering. In this case, a strong smoothing filter may be used. If not, the intra prediction unit does not perform reference sample filtering or performs reference sample filtering, but may determine to use a weak smoothing filter.

Furthermore, when a boundary sample number is greater than (or greater than or equal to) a threshold, the intra prediction unit may determine to perform reference sample filtering based on the boundary sample number. If not, the intra prediction unit does not perform reference sample filtering and performs reference sample filtering, but may determine to use a weak smoothing filter.

The threshold of a boundary sample number may be determined as a value previously agreed between the encoder and the decoder. The threshold may be included in a VPS, SPS, PPS, slice header or block header and transmitted from the encoder to the decoder. The decoder may determine whether to perform reference sample filtering and a filter type based on the received threshold.

A 1-dimensional binomial filter may be used as the weak smoothing filter. The 1-dimensional binomial filter may include a 1-2-1 filter or a 1-4-6-4-1 filter. An average filter or another type of linear/non-linear-weighting filter may be used as the strong smoothing filter.

As the size of peripheral blocks of a current block is reduced, the number of boundaries of the peripheral blocks included in a reference sample is increased. As the number of block boundaries increases, the probability that an error, such as artifacts, may occur increases. Accordingly, when the boundary of a peripheral block is included in a reference sample or the number of peripheral blocks including a boundary is greater than a threshold, the intra prediction unit can improve the accuracy of a prediction block by filtering the reference sample using a strong smoothing filter.

Embodiment 6: Use Distance Information Between Prediction Sample of Current Block and Reference Sample In Embodiment 6, a current block parameter is used in a process of determining whether to perform filtering and/or a filter type. The current block parameter includes distance information between a prediction sample and a reference sample. Specifically, the distance information includes a vertical distance between a current sample to be predicted within a prediction block (hereinafter a prediction sample) and the top reference sample 9020 (hereinafter a vertical distance) and/or a horizontal distance between the prediction sample and the left reference sample 9030 (hereinafter a horizontal distance).

The intra prediction unit may adaptively determine whether to perform reference sample filtering and/or a filter type based on the location of a prediction sample within a current block. For example, when the length of one side of a current block is N, the intra prediction unit may determine to perform reference sample filtering in a process of generating a predicted value of a prediction sample when at least any one of the x coordinates or y coordinates of the prediction sample is greater than N/2. In this case, the intra prediction unit may use a strong smoothing filter.

That is, the intra prediction unit may determine whether to perform reference sample filtering for each prediction sample. The intra prediction unit may determine to perform reference sample filtering in a process of generating a predicted value of a corresponding prediction sample when at least one of the horizontal distance or vertical distance of each prediction sample is greater than a threshold (or threshold distance). In this case, the intra prediction unit may use a strong smoothing filter. If not, the intra prediction unit does not perform reference sample filtering in a process of generating a predicted value of a corresponding prediction sample or determines to perform filtering, but may use a weak smoothing filter.

The threshold of each of the vertical distance and/or the horizontal distance may be determined as a value previously agreed between the encoder and the decoder. The threshold may be included in a VPS, SPS, PPS, slice header or block header and transmitted from the encoder to the decoder. The decoder may determine whether to perform reference sample filtering and a filter type based on the received threshold.

A 1-dimensional binomial filter may be used as the weak smoothing filter. The 1-dimensional binomial filter may include a 1-2-1 filter or a 1-4-6-4-1 filter. An average filter or another type of linear/non-linear-weighting filter may be used as the strong smoothing filter.

The accuracy of prediction decreases as the distance between a prediction sample and a reference sample increases. Furthermore, as the distance increases, the possibility that unnecessary information, such as noise, will be propagated increases. Accordingly, the accuracy of prediction can be improved using a strong smoothing filter for a prediction sample having a great distance from a reference sample.

Embodiment 7: Use a Combination of Embodiments 1 to 6

Whether to perform reference sample filtering and/or a filter type may be determined by combining one or more of the criteria of Embodiment 1 to Embodiment 6.

For example, a new criterion in which the length of a long side of a current block (embodiment 1) and peripheral block boundary information (embodiment 5) are combined may be defined. For another example, a new criterion in which the length of a small side of a current block (embodiment 1), the number of samples of a current block (embodiment 2), and the quantization parameter of a current/peripheral block (embodiment 3) are combined may be defined. Prediction accuracy can be further improved by combining the above-described embodiments.

Embodiment 8: Determine Whether to Independently Filter Top Reference Sample and Left Reference Sample and/or Filter Type Embodiment 8 is based on Embodiment 1. In Embodiment 8, the intra prediction unit determines whether to perform filtering on the top reference sample 9020 and the left reference sample 9030 and/or a filter type based on the length of each side of a current block. Table 2 is also used in Embodiment 8.

Specifically, referring back to FIG. 9, whether to perform filtering on the top reference sample 9020 and/or a filtering type is determined based on a horizontal edge length (horizontal side length) of a current block. Whether to perform filtering on the left reference sample 9030 and/or a filtering type is determined based on a vertical edge length (vertical side length). That is, a criterion according to the length of a left side (or vertical side) is applied to the left reference sample 9030. A criterion according to the length of a top side (or horizontal side) is applied to the top reference sample 9020. As shown in FIG. 9, as a result, reference sample filtering may be applied to the left reference sample 9030, and reference sample filtering may not be applied to the top reference sample 9020. Accordingly, the two reference samples can be independently filtered.

For example, when a vertical side length is 16 and a prediction mode is 8, filtering may be determined to be performed on the left reference sample 9030 according to the 16×16 block of Table 2. If the length of a horizontal side is 8 and a prediction mode is 8, filtering may be determined to be not performed on the top reference sample 9020 according to the 8×8 block of Table 2.

As in Embodiment 1, the top-left sample 9040 may be included in any one of the left reference sample 9030 and the top reference sample 9020. FIG. 9 shows that the top-left sample is included in the left reference sample 9030 and processed.

The contents described in Embodiment 1 may be identically applied to contents (filter type, etc.) in addition to determining whether to apply filtering to the left reference sample 9030 and the top reference sample 9020 separately. For example, a strong smoothing filter (an average filter or another type of linear/non-linear-weighting filter) may be applied to the left reference sample 9030.

Embodiment 9: First Determine Whether Reference to Reference Sample is Possible In Embodiment 9, prior to Embodiments 1 to 8, whether reference to each reference sample is possible (whether each reference sample can be used to generate a prediction block) is first determined. The present embodiment may be applied to a process of obtaining/generating a reference sample prior to reference sample filtering.

An intra prediction (intra mode) method may not use a reference sample in a process of generating a prediction block in some cases. For example, a case where a reference sample cannot be used includes a case where a current block is positioned at the edge of an image or a case where a neighbor block has been decoded in an inter-frame prediction mode (inter mode) (this is limited to some cases).

Accordingly, in Embodiment 9, the intra prediction unit first determines whether reference to each of the top reference sample 9020 and the left reference sample 9030 is possible.

Specifically, 1) the intra prediction unit determines whether to perform reference sample filtering based on the length of a left side (vertical side) if reference to only the left reference sample 9030, among the left reference sample 9030 and the top reference sample 9020, is possible, and determines whether to perform reference sample filtering based on the length of a top side (horizontal side) if reference to only the top reference sample 9020 is possible. In this case, whether to perform filtering is determined based on the length of the left side or upper side which is referenceable, but the application of filtering after the filtering is determined to be performed is applied to both the left reference sample 9030 and the top reference sample 9020. For a detailed method of determining whether to apply filtering based on the length of a side, reference is made to the description of Embodiment 7 or Embodiment 1.

2) If reference to both the left reference sample and the top reference sample is possible or reference to both the left reference sample and the top reference sample is impossible, the intra prediction unit may determine whether to perform reference sample filtering and/or a filter type according to the criteria of Embodiments 1 to 8. Furthermore, for another example, if reference to both the left/top reference sample 9020 is impossible, the intra prediction unit may fill all the reference samples with a default value (1<<(bitDepth-1)) and use them to generate a prediction block. For example, the reference samples may be filled with a 128 value in the case of an 8-bit image and may be filled with a 512 value in the case of a 10-bit image.

All the methods of Embodiments 1 to 9 may be performed in the intra prediction unit of the encoder or the decoder.

FIG. 10 is a block diagram of the intra prediction unit according to an embodiment of the present invention.

The intra prediction unit 10010 generates the prediction block of a current block based on an intra prediction mode. The intra prediction unit 10010 is included in the encoder (video coding apparatus) and/or the decoder (video decoding apparatus).

The intra prediction unit 10010 includes an intra prediction mode acquisition unit 10020, a reference sample acquisition unit 10030, a reference sample filtering unit 10040 and a prediction block generation unit 10050.

The intra prediction mode acquisition unit 10020 obtains an intra prediction mode of a current block. The intra prediction mode acquisition unit 10020 may perform the S501 procedure of FIG. 5.

After an intra prediction mode is obtained, the reference sample acquisition unit 10030 obtains a reference sample for generating a prediction block. The reference sample acquisition unit 10030 may perform the S502 procedure of FIG. 5.

After a reference sample is obtained, the reference sample filtering unit 10040 determines whether to perform filtering on the reference sample. If the filtering is determined to be performed, the reference sample filtering unit 10040 filters the reference sample. If filtering is determined to be not performed on the reference sample, the reference sample filtering unit 10040 does not filter the reference sample.

A current block processed in the intra prediction unit 10010 may correspond to a square block or a non-square block. If a current block is a non-square block, the reference sample filtering unit 10040 determines whether to perform filtering based on a current block parameter and/or a peripheral block parameter along with an intra prediction mode. For detailed contents regarding the current block parameter and the peripheral block parameter, reference is made to the description related to FIG. 9. That is, if a current block is a non-square block, the reference sample filtering unit 10040 may determine whether to perform reference sample filtering and/or a filter type according to the criteria of Embodiments 1 to 8.

The prediction block generation unit 10050 generates the prediction block of a current block using a reference sample that has not been filtered or a filtered reference sample. The prediction block generation unit 10050 may perform the S504 procedure of FIG. 5.

FIG. 11 shows a flowchart of a video decoding method according to an embodiment of the present invention.

Video decoding is performed by the video decoding apparatus (decoder).

The video decoding apparatus obtains an intra prediction mode of a current block (S11010). The procedure may be performed identically with or similar to the S501 procedure of FIG. 5, and thus a detailed description thereof is omitted.

The video decoding apparatus obtains a reference sample for generating the prediction block of the current block using a neighboring sample of the current block (S11020). This procedure may be performed identically with or similar to the S502 procedure of FIG. 5, and a detailed description thereof is omitted. Furthermore, in this step, the method of Embodiment 9 of FIG. 9 may be performed.

Thereafter, the video decoding apparatus determines whether to perform filtering on the reference sample (S11030), and filters the reference sample when the filtering is determined to be performed (S11040).

In the step of determining whether to perform filtering (S11030), the video decoding apparatus determines whether to perform filtering based on a current block parameter, that is, a parameter related to the current block, and/or a peripheral block parameter, that is, a parameter related to a peripheral block of the current block, along with an intra prediction mode. For detailed contents regarding the current block parameter and the peripheral block parameter, reference is made to the description related to FIG. 9.

Thereafter, the video decoding apparatus generates a prediction block using the reference sample or the filtered reference sample based on the intra prediction mode (S11050). This procedure may be performed identically with or similar to the S504 procedure of FIG. 5, and thus a detailed description thereof is omitted.

In the aforementioned embodiments, the elements and characteristics of the present invention have been combined in specific forms. Each of the elements or characteristics may be considered to be optional unless otherwise described explicitly.

Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A video decoding method by an apparatus, comprising:
obtaining an intra prediction mode of a current block;
obtaining a reference sample for intra prediction based on a neighboring sample of the current block;
filtering the reference sample based on a filtering is determined to be performed on the reference sample; and
generating a prediction block of the current block based on the intra prediction mode and the reference sample which is filtered or not,
wherein the filtering is determined to be performed based on a number of pixels of the current block and the intra prediction mode of the current block,
wherein the filtering is determined to be performed based on a distance between the current block and the reference sample,
wherein, based on the intra prediction mode of the current block being a horizontal mode or a vertical mode, the filtering is determined to be not performed, and
wherein an available shape of the current block includes a non-square shape.

2. The video decoding method of claim 1,
wherein the filtering is determined to be performed based on a first square block having a pixel number identical with a pixel number of the current block or a second square block which is a greatest block of square blocks having a pixel number smaller than the pixel number of the current block satisfies a predefined filtering performance condition.

3. The video decoding method of claim 1,
wherein the filtering is determined to be performed based on a first quantization parameter related to a quantization rate of the current block being greater than a first threshold, and
wherein the filtering the reference sample comprises determining a filter type based on the first quantization parameter being greater than the first threshold.

4. The video decoding method of claim 1,
wherein the filtering is determined to be performed based on a second quantization parameter related to a quantization rate of the neighboring block being greater than a fourth threshold, and
wherein the filtering the reference sample comprises determining a filter type based on the second quantization parameter being greater than the fourth threshold.

5. The video decoding method of claim 1,
wherein the neighboring block parameter comprises a number of residual coefficients of the neighboring block,
wherein the filtering is determined to be performed based on the number of residual coefficients being greater than a fifth threshold, and
wherein the filtering the reference sample comprises determining a filter type based on the number of residual coefficients being greater than the fifth threshold.

6. The video decoding method of claim 1,
wherein the neighboring block parameter comprises a flag indicating whether a residual coefficient is present in the neighboring block, and
wherein the filtering is determined to be performed based on the flag indicating that the residual coefficient is present.

7. An apparatus for decoding video, comprising:
an intra prediction unit configured to generate a prediction block of a current block based on an intra prediction mode,
wherein the intra prediction unit comprises:
an intra prediction mode acquisition unit configured to obtain the intra prediction mode of the current block;
a reference sample acquisition unit configured to obtain a reference sample for intra prediction;
a reference sample filtering unit configured to filter the reference sample based on a filtering is determined to be performed on the reference sample; and
a prediction block generation unit configured to generate the prediction block of the current block based on the intra prediction mode and the reference sample which is filtered or not,
wherein the reference sample filtering unit is configured to determine the filtering to be performed based on a number of pixels of the current block and the intra prediction mode of the current block,
wherein the filtering is determined to be performed based on a distance between the current block and the reference sample,
wherein, based on the intra prediction mode of the current block being a horizontal mode or a vertical mode, the filtering is determined to be not performed, and
wherein an available shape of the current block includes a non-square shape.

8. A video encoding method by an apparatus, comprising:
determining an intra prediction mode of a current block;
obtaining a reference sample for intra prediction based on a neighboring sample of the current block;

filtering the reference sample based on a filtering is determined to be performed on the reference sample; and generating a prediction block of the current block based on the intra prediction mode and the reference sample which is filtered or not, wherein the filtering is determined to be performed based on a number of pixels of the current block and the intra prediction mode of the current block, wherein the filtering is determined to be performed based on a distance between the current block and the reference sample, wherein, based on the intra prediction mode of the current block being a horizontal mode or a vertical mode, the filtering is determined to be not performed, and wherein an available shape of the current block includes a non-square shape.

9. A non-transitory computer-readable storage medium storing a bitstream that is generated by a video encoding method, wherein the video encoding method comprising:

determining an intra prediction mode of a current block;

obtaining a reference sample for intra prediction based on a neighboring sample of the current block;

filtering the reference sample based on a filtering is determined to be performed on the reference sample; and generating a prediction block of the current block based on the intra prediction mode and the reference sample which is filtered or not, wherein the filtering is determined to be performed based on a number of pixels of the current block and the intra prediction mode of the current block, wherein the filtering is determined to be performed based on a distance between the current block and the reference sample, wherein, based on the intra prediction mode of the current block being a horizontal mode or a vertical mode, the filtering is determined to be not performed, and wherein an available shape of the current block includes a non-square shape.

* * * * *